(12) United States Patent
Bernard et al.

(10) Patent No.: US 8,853,308 B2
(45) Date of Patent: Oct. 7, 2014

(54) HYDRODISPERSIBLE POLYISOCYANATE COMPOSITIONS

(75) Inventors: Jean-Marie Bernard, Saint-Laurent d'Agny (FR); Philippe Olier, Lyons (FR)

(73) Assignee: Vencorex France, Saint Priest (FR)

( * ) Notice: Subject to any disclaimer, the term of this patent is extended or adjusted under 35 U.S.C. 154(b) by 0 days.

(21) Appl. No.: 12/743,619

(22) PCT Filed: Nov. 18, 2008

(86) PCT No.: PCT/FR2008/052075
§ 371 (c)(1),
(2), (4) Date: Jun. 8, 2010

(87) PCT Pub. No.: WO2009/071793
PCT Pub. Date: Jun. 11, 2009

(65) Prior Publication Data
US 2010/0273920 A1    Oct. 28, 2010

(30) Foreign Application Priority Data
Nov. 20, 2007  (FR) ..................... 07 59172

(51) Int. Cl.
C08K 5/1515   (2006.01)
C08K 5/17     (2006.01)
C08K 5/51     (2006.01)

(52) U.S. Cl.
USPC ............ 524/114; 524/140; 524/141; 524/196

(58) Field of Classification Search
USPC .................................. 524/114, 140, 141, 196
See application file for complete search history.

(56) References Cited

U.S. PATENT DOCUMENTS 5,854,332 A    12/1998   Swarup et al.

FOREIGN PATENT DOCUMENTS

| WO | WO9712924 | 4/1997 |
| WO | WO02/22703 | 3/2002 |
| WO | WO2006/097318 | 9/2006 |

OTHER PUBLICATIONS

The Jeffamine Polyetheramines data sheet. 2007.*

* cited by examiner

*Primary Examiner* — John Uselding
(74) *Attorney, Agent, or Firm* — Michael B. Fein, Esq.; Eckert Seamans Cherin & Mellott, LLC

(57) ABSTRACT

A composition comprising:
  at least one (poly)isocyanate and
  at least one surfactant comprising an acid or a mixture of acids and an optionally heterocyclic amine or polyamine or a mixture of such amines, the amine or polyamine or at least one amine of said mixture carrying at least one alkylene oxide, preferably ethylene oxide, functional group.

9 Claims, No Drawings

HYDRODISPERSIBLE POLYISOCYANATE COMPOSITIONS

CROSS-REFERENCE TO RELATED APPLICATIONS

The present application is a 35 U.S.C. 371 National Stage Application of International Application No. PCT/FR2008/052075, International Filing Date: Nov. 18, 2008, which claims priority under 35 U.S.C. §119(a) to France Application No. 07 59172, Filing Date: Nov. 20, 2007, each of which are incorporated herein by reference in its entirety.

The present invention relates to novel hydrodispersible polyisocyanate compositions, to a process for the preparation thereof, and to the use thereof in the preparation of coatings, in particular paints or varnishes.

The fields of application in which coatings are used are very diverse and increasingly require very high-tech coating compositions which have excellent properties both in terms of the application of the coating and in terms of the characteristics of the finished product.

There is a continuing demand for coatings which have improved properties, in particular which dry more quickly, are more resistant to impact and shock and exhibit improved behaviour in respect of all types of chemical attacks, organic, microbial or atmospheric, as well as improved resistance to pressure washing, in particular for substrates made of plastics materials.

In the automotive industry, for example, there is a strong demand for coating compositions which have excellent shock resistance properties, in particular chipping resistance properties, in particular for coating compositions intended for original equipment, that is to say as a bodywork primer coating, as a base coating or as a top coat.

It is an object of the present invention to provide novel polyisocyanate compositions with which coatings having satisfactory properties of self-emulsification, homogeneity and gloss can be obtained.

It is an object of the present invention to provide novel compositions which enable coatings to be obtained which solve the problems encountered during use, and with which it is possible especially to avoid the odour problems associated, for example, with the use of amines of low molecular weight.

The present invention relates to a composition comprising:
- at least one (poly)isocyanate and
- at least one surfactant comprising:
  (i) at least one acid or a mixture of acids, and
  (ii) at least one optionally heterocyclic amine or polyamine or a mixture of such amines, said amine carrying at least one alkylene oxide, preferably ethylene oxide, functional group.

The amine constituting said surfactant can be a heterocyclic amine, it being possible for said heterocycle to contain at least one other heteroatom. Within the scope of the present invention, when the amine of the surfactant is a heterocyclic amine, the alkylene oxide functional group is preferably carried by the nitrogen atom of the amine functional group.

The above-mentioned amine can contain a plurality of identical or different alkylene oxide functional groups, and those various functional groups can be in blocks or alternating.

The term "polyamine" denotes a compound having at least two amine functional groups. Among the polyamines, special mention may be made of the polyetheramines Elastamine® (Huntsman) and Jeffamine® (Huntsman), and more particularly of the following products:

RP-409 (or XTJ-582) having a molecular weight of approximately 400, and RP-2009 (or XTJ-578) having a molecular weight of approximately 2000, the basic skeleton of which is as follows:

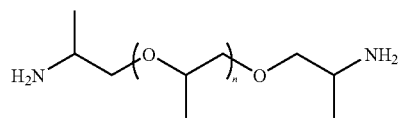

RTP-1006 (or XTJ-542) and RTP-1407 (or XTJ-559) having a poly(tetramethylene ether) glycol (PTMEG) basic skeleton, as follows:

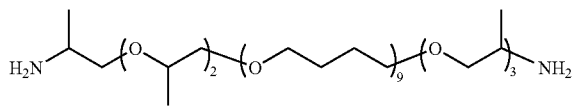

RE-600 (or XTJ-500), RE-900 (XTJ-501) or RE-2000 (or XTJ-502) having a PEG basic skeleton, as follows:

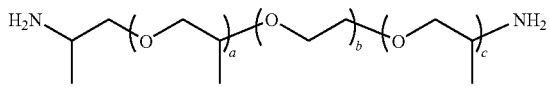

RTP-2007, RTP-2005, RTP-1006 and RTP-1407 of the following formula:

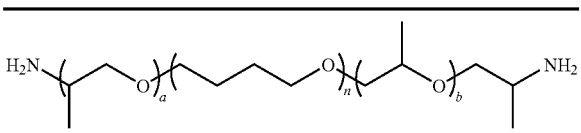

| Name | Molecular weight | n | a | b | Moles of propylene oxide (PO) |
|---|---|---|---|---|---|
| RTP-2007 (or XTJ-533) | 2000 | 9 | 12 | 11 | 24 |
| RTP-2005 (or XTJ-536) | 2000 | 14 | 9 | 8 | 18 |
| RTP-1006 (or XTJ-542) | 1000 | 9 | 3 | 2 | 6 |
| RTP-1407 (or XTJ-559) | 1350 | 14 | 3 | 2 | 6 |

HT-1700 (or XTJ-548) of the following formula:

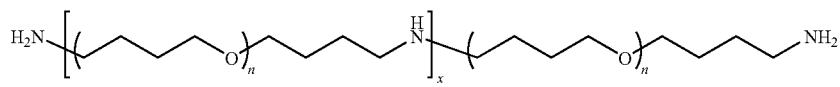

wherein n=13 and x=0-2

HE-150 (or XTJ-504):

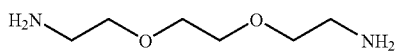

HE-180 (or XTJ-590):

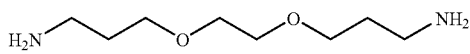

HE-1000 (PEG type):

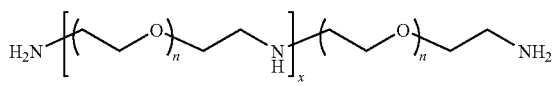

wherein n=13 and x=0-1

Mention may also be made of the compounds of the HT series:

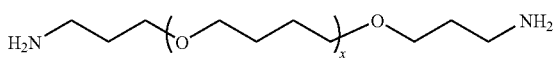

and of the compounds of the HP-2000 (bis(aminopropyl) PEA) series:

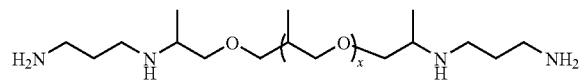

Among the polyamines, mention may also be made of the compound XTJ-616 (propylene oxide-based tetrafunctional amine) having a molecular weight of approximately 600:

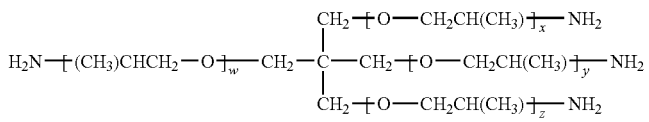

or alternatively of the compounds XTJ-523 or XTJ-527 (butylene oxide skeleton):

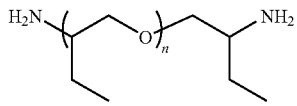

The (poly)isocyanate composition comprised in the composition according to the present invention consists completely of isocyanate and polyisocyanate, alone or in combination with one or more other isocyanates and/or polyisocyanates. The term "(poly)isocyanate" is here to be understood as encompassing the terms "isocyanate" and "polyisocyanate".

The surfactant is advantageously selected so that it comprises no or few functional groups which are reactive with the (poly)isocyanate. In other words, the surfactant is present in the solvent-based composition in a substantially free form (in contrast with a form bonded by means of a chemical bond to the (poly)isocyanate).

The expression "substantially free form" means that less than 50%, advantageously less than 20%, preferably less than 10% by weight of the surfactant is in a bonded form.

However, compositions in the form of a solution in which the surfactant is completely bonded in a covalent manner to the (poly)isocyanates are also included within the scope of the present invention.

The compositions according to the invention are hydrodispersible and will also be called "hydrodispersible polyisocyanate compositions" hereinbelow.

The hydrodispersible nature of the polyisocyanate compositions is verified by taking 1 g of polyisocyanate composition mixture and dispersing it in 10 ml of water. After stirring for a few minutes, a milky dispersion of polyisocyanate composition in the water is observed.

Additional tests are carried out by preparing a varnish formulation composed of the hydrodispersible polyisocyanate mixture with a hydrodispersible polyol or polyurethane (PUD), optionally in the presence of a solvent. The formulation is then applied to a sheet of glass and left to dry at controlled temperature and humidity. The formation of a glossy film indicates good dispersion of the various constituents of the varnish in the water.

According to a particular embodiment, the present invention relates to a composition comprising:
  at least one (poly)isocyanate and
  at least one surfactant comprising at least one acid or a mixture of acids and at least one amine carrying a polyoxyalkylene, preferably polyoxyethylene, chain.

According to another embodiment, the surfactant can be in salt form.

The present invention relates also to a composition comprising:
  at least one (poly)isocyanate and
  at least one surfactant as defined hereinbefore comprising at least one acid carrying at least one group —X—H, X being selected from the elements of the oxygen, nitrogen, carbon columns.

The present invention relates also to a composition comprising:
  at least one (poly)isocyanate and
  at least one surfactant as defined hereinbefore comprising at least one acid whose $pK_a$ in water is less than 5, preferably less than 4 and advantageously less than 3.

The present invention relates also to a composition as defined hereinbefore, in which the molar ratio between the sum of the acid functional groups and the sum of the amine functional groups is from 0.5 to 2.5, advantageously from 0.7 to 1.5 and preferably from 1 to 1.2.

Within the scope of the present invention, it is not necessary to neutralize all the acid functional groups by the amines. Such a ratio allows the nature of the surfactant system to be modified by making it more or less hydrophilic according to the proportion of ionic functional groups. It also makes it possible to limit the secondary reactions which may take place between the isocyanate groups and the acid functional groups when the ratio is greater than 1.

According to a particular embodiment, the composition according to the invention can comprise at least one amine as defined hereinbefore, that is to say an amine carrying at least one alkylene oxide, preferably ethylene oxide, functional group, and another amine which can be a primary and/or secondary and/or tertiary amine that does not contain an alkylene oxide fragment.

According to a preferred embodiment, the acid or at least one acid of the mixture of acids of the composition according to the invention comprises at least one group Q selected from the group constituted by $[-S-(O)_2]-NH-[-S-(O)_2]-$, $[-S-(O)_2]-NH-CO-$, $[-S-(O)_2]_3-CH-$, $[-S-(O)_2]_2-CH-C(=O)-$ and $[-S-(O)_2]-CH[-C(=O)-]_2$, it being possible for said groups Q optionally to be bonded, via the sulfur atom or via the carbon atom, directly to at least one carbon chain containing from 1 to 20 carbon atoms and optionally containing at least one halogen atom, especially at least one fluorine atom, and optionally heteroatoms, it being possible for that chain to be alkyl, aryl, aralkyl, cyclic, aromatic, heterocyclic, linear and/or branched.

According to another embodiment, the acid or at least one acid of the mixture of acids has the following formula (I):

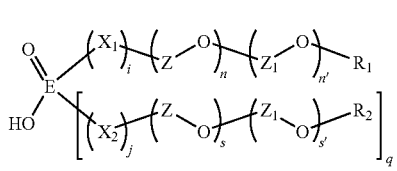

(I)

in which:
E represents phosphorus or carbon,
Z and $Z_1$ represent, independently of one another, a linear or branched divalent alkylene radical having from 2 to 10, preferably from 2 to 4, carbon atoms, it being possible for Z and $Z_1$ to be identical or different, it being possible for the alkylene units to be linked together in a random manner or arranged in the form of blocks,
$R_1$ and $R_2$, which are identical or different, represent, independently of one another, H or a linear, branched or (hetero)cyclic hydrocarbon chain, advantageously selected from the $C_6$-$C_{30}$-aryl groups and the $C_1$-$C_{30}$-alkyl groups, optionally substituted, advantageously $C_4$-$C_{16}$-alkyl groups optionally substituted by at least one halogen, especially a fluorine,
$X_1$ and $X_2$, which are identical or different, represent, independently of one another, S, O, N(R), R representing H, an alkyl group containing from 1 to 20 carbon atoms, a bond or a hydrocarbon chain, optionally containing at least one heteroatom, preferably selected from oxygen and sulfur, bonded to $R_1$ or $R_2$ in order to constitute an optionally substituted, linear or branched divalent alkylene radical containing from 2 to 30 carbon atoms, said alkylene radical preferably being composed of from 3 to 5 carbon atoms, and optionally containing at least one heteroatom, preferably selected from oxygen and sulfur, or, when E represents a phosphorus atom, $X_1$ and/or $X_2$ can represent $-O-[P(=O)-(A)]_v-(O)_u-$, wherein:
A represents OH, $-O-[(Z-O)_n-(Z_1-O)_{n'}]-R_1$, $[(Z-O)_n-(Z_1-O)_{n'}-]R_1$, $-O-[(Z-O)_s-(Z_1-O)_{s'}-]-R_2$ or $[-(Z-O)_s-(Z_1-O)_{s'}-]-R_2$, Z, $Z_1$, $R_1$ and $R_2$ being as defined hereinbefore,
v is an integer from 1 to 6, preferably 1 or 2,
u is an integer 0 or 1,
i and j represent, independently of one another, 0 or 1;
n and n' represent, independently of one another, zero or an integer from 1 to 30;
q represents zero or 1; and
s and s' represent, independently of one another, zero or an integer from 1 to 30; with the proviso that when E is C, q is zero, and when E is C and $X_1$ is an oxygen atom, $R_1$ is advantageously other than H.

When E represents a phosphorus atom and $X_1$ represents a radical $-O-[P(=O)-(A)]_v-(O)_u-$, the compound of formula (I) belongs to the family of the symmetrical or unsymmetrical pyroacids, such as the diesters, of pyrophosphoric acid.

When $X_1$ and/or $X_2$ represents a bond or an alkylene radical, it is possible to have a cyclic compound with nitrogen N in the ring, it being possible for the ring to be bonded to $R_1$ or $R_2$.

According to another embodiment, the acid or at least one acid of the mixture of acids has the following formula (II):

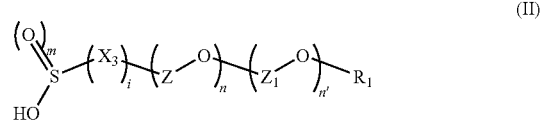

(II)

in which:
m is 1 or 2;
$X_3$ represents $-O-$ or $-NR-$, R being as defined hereinbefore for formula (I),
Z, $Z_1$, $R_1$, i, n and n' being defined as hereinbefore for formula (I).

According to yet another embodiment, the acid or at least one acid of the mixture of acids is a combination of the structures presented hereinbefore carried on the same molecule, which can be represented by the following formula (III):

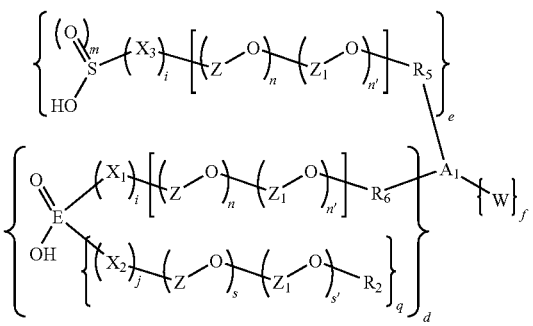

(III)

in which:
$A_1$ represents the radical of a hydrocarbon molecule containing from 1 to 100 carbon atoms and optionally containing at least one halogen atom, preferably at least one fluorine atom,
d represents an integer from 0 to 10, preferably from 0 to 3,
e represents an integer from 0 to 10, preferably from 0 to 3,
f represents an integer from 0 to 10, preferably from 0 to 3,
the sum of d+e+f being from 2 to 10,
W represents a hydrocarbon radical containing a group Q as defined hereinbefore,
E represents a phosphorus or carbon atom,
$R_5$ and $R_6$ represent, independently of one another, an optionally substituted, linear or branched divalent alkylene radical containing from 0 to 10 carbon atoms.

An advantageous composition according to the present invention is characterized in that the acid or at least one acid of the mixture of acids has the following formula (I-1):

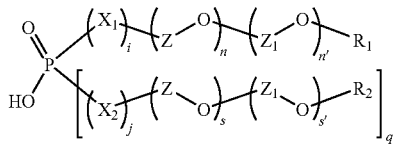
(I-1)

in which:
i, j, n, n', s, s', q, Z, $Z_1$, $R_1$ and $R_2$ are as defined hereinbefore for formula (I),
$X_1$ and $X_2$, which are identical or different, represent, independently of one another, —O— or —O—[P(=O)-(A)]$_v$-(O)$_u$—, A, u and v being as defined hereinbefore for formula (I).

Advantageously, the acid or at least one acid of the mixture of acids of the composition as defined hereinbefore has formula (II) as defined hereinbefore.

According to another advantageous embodiment, the acid or at least one acid of the mixture of acids of the composition as defined hereinbefore has the following formula (I-3):

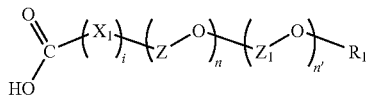
(I-3)

in which:
i, n, n', Z and $Z_1$ and $R_1$ are as defined hereinbefore for formula (I),
$X_1$ represents O or N(R), R being as defined hereinbefore for formula (I).

According to another advantageous embodiment, the acid or at least one acid of the mixture of acids of the composition as defined hereinbefore has formula (III) as defined hereinbefore.

Preferably, the acid or one of the acids of the mixture of acids of the composition as defined hereinbefore is selected from the group constituted by:
sulfonic acids, such as para-toluenesulfonic acid, dodecylbenzenesulfonic acid, naphthalenesulfonic acid, xylenesulfonic acid, camphorsulfonic acid, methane-sulfonic acid, dodecanesulfonic acid, 3-sulfopropyl acrylate acid, 3-sulfopropyl methacrylate acid, trifluoromethanesulfonic acid, perfluorobutanesulfonic acid, sulfophthalic acid and perfluorooctanesulfonic acid;
sulfinic acids, such as benzenesulfinic acid and para-toluenesulfinic acid;
monoesters and diesters of alkyl phosphates, such as dibutyl acid phosphate, di-(2-ethylhexyl) acid phosphate, didodecyl acid phosphate, di-(neodecanoyl) acid phosphate, monobutyl acid phosphate and monostearyl acid phosphate;
alkylphosphonic acids and monoesters of alkylphosphonic acids, such as methylphosphonic acid, octylphosphonic acid, hexadecamethylenephosphonic acid and 2-chloroethylphosphonic acid;
perfluoroacetic acids, such as trifluoroacetic acid and hexafluoropropionic acid;
bis(trifluoromethane)sulfonimide;
triethylsulfonylmethane;
acid sulfates, such as dodecasulfate acid, or ether acid sulfates of polyethylene glycol monoalkyl ethers, the alkyl ether being a hydrocarbon chain having from 1 to 8 carbon atoms,
sulfamic acids, such as cyclohexylsulfamic acid, butylsulfamic acid, N,N-dimethylsulfamic acid,
mono- and di-ester phosphates of polyethylene glycol monoalkyl ether,
alkylenebisphosphonic acids, such as methylenebisphosphonic acid, or alkylenebisphosphonic acid esters,
naphthalenetrisulfonic acid, and
sulfobenzoic acid.

Within the scope of the present invention, the acid can optionally be obtained by a precursor of an acid compound, such as an acid anhydride or chloride.

Within the scope of the present invention, the amine can also be in the form of a salt.

The composition as defined hereinbefore preferably comprises an amine having the following formula (IV):

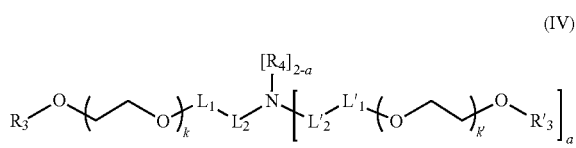
(IV)

in which:
a is 0, 1 or 2;
$R_4$ represents a hydrogen atom or a linear or branched hydrocarbon chain advantageously selected from the cyclic or non-cyclic $C_1$-$C_{20}$-alkyl groups, and preferably from the $C_1$-$C_4$-alkyl groups, or from the aryl groups containing from 6 to 30 carbon atoms; and when a=0, the groups $R_4$ can be identical or different and, where appropriate, can form between them a ring containing from 2 to 20 carbon atoms, preferably from 4 to 6 carbon atoms;
$R_3$ and $R'_3$, which are identical or different, represent a hydrogen atom or an optionally substituted, linear or branched or (hetero)cyclic hydrocarbon chain, advantageously selected from the $C_1$-$C_{20}$-alkyl groups, and preferably from the $C_1$-$C_4$-alkyl groups, or from the aryl groups containing from 6 to 30 carbon atoms;
k represents an integer greater than or equal to 1, preferably greater than or equal to 2, advantageously from 5 to 60, and preferably from 5 to 40;
k' represents an integer advantageously from 0 to 60, and preferably from 5 to 40;
$L_1$ and $L'_1$, which are identical or different, represent, independently of one another, a radical of formula -[-L'-O—]$_t$—, t representing an integer from 0 to 20 and L' representing a linear or branched alkylene radical containing from 3 to 10 carbon atoms, L' preferably representing a radical —CH(CH$_3$)—CH$_2$— or —(CH$_2$)$_4$—, it being possible for the t groups L' to be identical or different;
$L_2$ and $L'_2$, which are identical or different, represent, independently of one another, a linear or branched divalent alkylene radical advantageously containing from 1 to 20 carbon atoms, and preferably representing a radical —CH(CH$_3$)—CH$_2$—, —CH$_2$—CH(CH$_3$)— or —(CH$_2$)$_4$—.

According to another embodiment, the composition of the invention comprises a polyamine of the following formula (V):

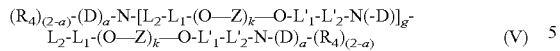

(V)

in which:

D represents H or $R_3$—(O—Z)$_k$—O-L$_1$-L$_2$- or $R_4$,

Z represents an optionally substituted alkylene radical containing from 2 to 6 carbon atoms, Z preferably being an ethylene group, g represents an integer from 0 to 5, preferably from 0 to 2, a, k, $R_3$, $R_4$, $L_1$, $L_2$, $L'_1$ and $L'_2$ being as defined hereinbefore for formula (IV).

Preferably, the amine or at least one amine of the mixture of amines of the composition of the present invention has the following formula (A):

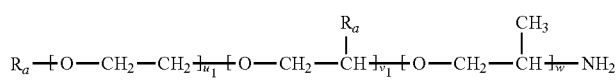

(A)

in which: $u_1$ represents an integer, preferably greater than or equal to 2, advantageously from 5 to 60, and preferably from 5 to 40, $v_1$ represents an integer from 0 to 30, preferably from 0 to 10, w represents an integer from 1 to 30, preferably from 1 to 10, $R_a$ represents an alkyl group containing from 1 to 20 carbon atoms, especially a methyl group or an alkyl group containing from 12 to 14 carbon atoms, it being possible for all the groups $R_a$ to be identical or different.

The amines that are preferred within the scope of the present invention are the following:

an amine of formula (A) in which $v_1$ is other than 0, $R_a$ represents a $C_{12}$-$C_{14}$-alkyl radical and the ethylene oxide/propylene oxide ratio ($u_1$/w) is 9/2 (this amine is called Jeffamine® XTJ 247 and has a molecular weight of approximately 700); or an amine of formula (A) in which $v_1$ is other than 0, $R_a$ represents a methyl group and the ethylene oxide/propylene oxide ratio ($u_1$/w) is 12/2 (this amine is called Jeffamine® XTJ 581 and has a molecular weight of approximately 730).

The present invention relates also to a composition as defined hereinbefore, characterized in that:

at least one acid has the following formula (I-1-1):

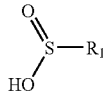

(I-1-1)

$R_1$ and $R_2$ being as defined hereinbefore for formula (I), and at least one amine has the formula (A) as defined hereinbefore wherein $v_1$=0 and the ratio $u_1$/w is greater than 5.

Accordingly, formula (I-1-1) encompasses the mono- and di-esters of the alkyl phosphates (hydrophobic phosphates).

Preferably, the compositions of the invention have a monoester/diester molar ratio of from 1 to 99%.

The present invention relates also to a composition as defined hereinbefore comprising a sulfonic acid or a sulfinic acid of the following formula (I-2-1):

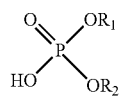

$R_1$ being as defined hereinbefore for formula (II).

An advantageous composition according to the present invention is characterized in that:

at least one acid has the formula (I-1) as defined hereinbefore, in which n and/or s and/or n' and/or s' are other than zero and are advantageously greater than or equal to 3, preferably greater than or equal to 4, and at least one amine has the formula (A) as defined hereinbefore wherein $v_1$=0 and the ratio $u_1$/w is less than 5, or the formula (A) as defined hereinbefore wherein $v_1$ is other than 0, $R_a$ representing an alkyl group containing from 12 to 14 carbon atoms.

Accordingly, the surfactants that are preferred according to the present invention are selected from the following salts: bis(2-ethyl-hexyl) phosphate salts of XTJ 581, dibutyl phosphate salts of XTJ 581, para-toluenesulfonate salts of XTJ 581, dodecylbenzenesulfonate salts of XTJ 581, and 3-phosphonopropyltetraoxyethylene cetyl ether salts of XTJ 247.

The composition according to the present invention can comprise a molecule carrying both the amine functional groups and the acid functional groups, especially an aminated acid having polyether functional groups.

Within the scope of the present invention, it is possible for all or some of the acid and/or amine to react with the NCO functional groups of the polyisocyanates to yield a surface-active polyisocyanate.

The composition according to the present invention can also comprise compounds such as those obtained in the reaction of a polyisocyanate with a polyalkylene glycol monoalkyl ether, preferably polyethylene glycol monoalkyl ether, in a percentage by weight of from 5 to 20%, preferably from 8 to 15% by weight.

Accordingly, the composition according to the present invention can also comprise compounds such as those sold by Bayer (for example Bayhydur® N 3100 or Bayhydur® 305, Bayhydur® 302), that is to say a surface-active polyisocyanate (polyethylene glycol monoalkyl ether having reacted with the NCO functional groups at a rate of from 5 to 15% by weight), or compounds such as Bayhydur® XP 2487 or XP 2655, in which the surface-active part is constituted by the grafting of sulfonate units neutralized by an amine.

According to a preferred embodiment, the composition according to the present invention is characterized in that the (poly)isocyanate is a (poly)isocyanate selected from the products of homo- or hetero-condensation of alkylene diisocyanate, in particular comprising products of the "biuret" and "trimer" type, even "prepolymers" with an isocyanate functional group, especially comprising urea, urethane, allophanate, ester, amide, acylurea, isocyanurate, oxadiazinetrione, imino-dimer, imino-trimer (iminotriazinedione), imino-oxadiazinedione (also known as an asymmetric trimer) and diazetidinedione (also known as a dimer) functional groups, and mixtures thereof.

The polyisocyanate compounds can also comprise true carbonate functional groups (R—O—C(=O)—NH$_2$) or epoxy functional groups or (preferably cyclic) carbonate functional groups.

They can be, for example, polyisocyanates sold by Rhodia under the name "Tolonate®".

The polyisocyanates which are used to prepare the hydrodispersible polyisocyanate compositions have NCO titres of generally from 5 to 25%.

Specific monoisocyanates can be used in the preparation of the hydrodispersible polyisocyanate compositions in order to modify particular properties. An example of monoisocyanates of this type are the isocyanate propyl trialkoxysilanes.

Other polyisocyanates with an NCO functionality greater than 2 can also be used to prepare the hydrophilic polyisocyanate compositions. Mention may accordingly be made of lysine diisocyanate isocyanatoethyl, which allows the viscosity of the final polyisocyanate compositions to be reduced.

It is also possible to use (poly)isocyanates as defined hereinbefore which are also rendered hydrophilic by grafting a suitable hydrophilic additive.

Generally, preferred (poly)isocyanates are (poly)isocyanates which are obtainable and generally obtained by homo- or hetero-condensation of aliphatic isocyanate monomers, (cyclo- or aryl-)aliphatic monomers, selected from the group constituted by the following monomers:

1,6-hexamethylene diisocyanate,
1,12-dodecane diisocyanate,
cyclobutane-1,3-diisocyanate,
cyclohexane-1,3- and/or -1,4-diisocyanate,
1-isocyanato-3,3,5-trimethyl-5-diisocyanatomethylcyclohexane (isophorone diisocyanate, IPDI),
isocyanatomethyloctylene diisocyanate (TTI),
2,4 and/or 2,6-hexahydrotoluene diisocyanate (H$_6$TDI),
hexahydro-1,3- and/or -1,4-phenylene diisocyanate,
perhydro 2,4'- and/or 4,4'-diphenylmethane diisocyanate (H$_{12}$MDI), and in general aromatic amino precursors or perhydrogenated carbamates,
bis-isocyanatomethylcyclohexanes (in particular 1,3 and 1,4) (BIC),
bis-isocyanatomethylnorbornanes (NBDI),
2-methylpentamethylene diisocyanate (MPDI),
tetramethylxylylene diisocyanates (TMXDI),
lysine diisocyanate as well as lysine di- or triisocyanate esters (LDI or LTI),
2,4- and/or 2,6-toluene diisocyanate,
diphenylmethane-2,4'- and/or -4,4'-diisocyanate (MDI),
1,3- and/or 1,4-phenylene diisocyanate,
triphenylmethane-4,4',4''-triisocyanate, and
oligomers of MDI or of TDI.

The products of homocondensation are the products derived from the condensation of one of the isocyanate monomers listed above with itself. The products of heterocondensation are the products derived from the condensation of two or more of the monomers listed above, either together and/or optionally with one or more compounds having a mohile hydrogen, such as an alcohol, a diol and other similar compounds.

The polyisocyanates contained in the composition of the present invention can also be polyisocyanate derivatives resulting from aromatic isocyanates used alone or mixed with aliphatic compounds.

However, the use of these aromatic derivatives is limited in terms of the amount and is also not a preferred variant, since this generally results in coatings which may undergo discolouration, generally yellowing, as they age, especially if the coatings are exposed to a high degree of ultraviolet radiation, for example solar ultraviolet radiation.

Non-limiting examples of aromatic isocyanates include:
2,4- and/or 2,6-toluene diisocyanate,
diphenylmethane-2,4'- and/or -4,4'-diisocyanate (MDI),
1,3- and/or 1,4-phenylene diisocyanate,
triphenylmethane-4,4',4''-triisocyanate, and
oligomers of MDI or TDI.

Mixtures of these (cyclo)aliphatic and/or aromatic polyisocyanates can also be used.

The viscosity of the non-masked polyisocyanate compounds used in the invention lies in a very wide viscosity range determined by the structure of the polyisocyanate compounds which can be used. The viscosity is generally greater than 10 mPa·s at 25° C. with a solids content of 100%, preferably greater than 100 mPa·s at 25° C. with a solids content of 100%.

The viscosity of Rhodia products is given by way of example, such as Tolonate® HDT-LV2 which has a viscosity of approximately 600 mPa·s±150 mPa·s at 25° C., or Tolonate® HDT with a viscosity of 2400 mPa·s±400 mPa·s at 25° C., or Tolonate® HDB with a viscosity of 9000 mPa·s±2000 mPa·s at 25° C., or Tolonate® HDT HR with a viscosity of approximately 20 000 mPa·s at 25° C. with a solids content of 100%, or 2000 mPa·s at 25° C. with a solids content of 90% in n-butyl acetate.

Some polyisocyanate compounds are solid at a solids content of 100%. For example, this is the case for the IPDI isocyanurate trimer or IPDI dimer. The viscosities of some of these compounds in an organic solution are given by way of example; Tolonate® IDT 70 S (IPDI isocyanurate trimer) thus has a viscosity of approximately 1700 mPa·s±600 mPa·s at 25° C. for a formulation having a solids content of 70% in Solvesso® 100, Tolonate® IDT 70 B (IPDI isocyanurate trimer) has a viscosity of approximately 600 mPa·s±300 mPa·s at 25° C. for a formulation having a solids content of 70% in n-butyl acetate.

Homocondensation and/or heterocondensation products originating from an aliphatic, in particular non-cyclic, diisocyanate monomer, preferably HDI, are preferred due to the ability thereof to impart high resistance to chipping to coatings.

The present invention relates also to a composition as defined hereinbefore, in which the (poly)isocyanate is a (poly)isocyanate having an average functionality of isocyanate functional groups of at least 2 and not more than 20, preferably from 2.2 to 10, advantageously from 2.5 to 6 and yet more preferably from 2.75 to 5.

It has been observed that when the average functionality of isocyanate functional groups of the (poly)isocyanate increases, the resistance to chipping and the hardness of the coating are improved; this phenomenon is particularly marked in the case of retouching operations.

Within the scope of the present invention, the average functionality of isocyanate functional groups f(iNCO) is defined by the following formula:

$$f(\text{iNCO}) = \frac{\text{Mn} \times [\text{iNCO}]}{42 \times 100}$$

where: Mn represents the number-average molecular weight obtained by gel permeation and
[iNCO] represents the concentration of isocyanate functional groups in grams per 100 grams.

The (poly)isocyanates present in the composition according to the invention can be present in masked form, that is to say that the isocyanate functional groups are not free but are masked by a masking agent or a mixture of masking agents, such as those defined below. In particular, the use of masked (poly)isocyanate compositions is preferred in order to prepare a coating formulation of the one-component type (1K formulation).

Masked (poly)isocyanate is to be understood in the present description as being a (poly)isocyanate for which at least 50%, preferably 80%, advantageously 90%, and yet more preferably all of the isocyanate functional groups are masked.

The masking agent or the mixture of masking agents which temporarily or permanently protects the isocyanate functional groups are compounds which have at least one functional group carrying a labile hydrogen, generally one functional group carrying a labile hydrogen, preferably a single functional group carrying a labile hydrogen, and are reactive in relation to the isocyanate functional group. This functional group which carries a labile hydrogen can have a $pK_a$ value corresponding either to the ionization of an acid [including the hydrogen of -ol functional groups ("-ol(s)" is to be understood in the present description as phenols and alcohols)], or to the associated acid of a base (generally nitrogenated).

More specifically, in order to optimize the results of the present invention, said $pK_a$ (or one of them if a plurality thereof can be determined) of the functional group carrying one or more labile hydrogens is at least 4, advantageously 5, preferably 6, and not more than 14, advantageously 13, preferably 12 and more preferably 10. However, an exception must be made for the lactams, the $pK_a$ of which is greater than these values and which represent possible masking agents, although they are not preferred for the invention.

A masking agent is known as a temporary masking agent when the isocyanate functional group is protected temporarily by the masking agent and does not react under the conditions of storage of the formulated system with the hydroxyl functional groups of the compound having a mobile hydrogen, especially with the polyol, but is subsequently freed during the thermal crosslinking reaction in a furnace.

The freed isocyanate functional group then reacts with the functional groups having a mobile hydrogen or the polyol reagent in order to produce a urethane bond and to form a polyurethane network which forms a portion of the coating. The temporary masking agent is either eliminated as a volatile organic compound along with most of the solvents in the formulation, or remains in the film, or reacts with the aminoplastic resin when the formulation contains said aminoplastic resin.

Non-limiting examples of temporary masking agents according to the invention which may be mentioned are hydroxylamine derivatives such as hydroxysuccinimide, and oximes such as methyl ethyl ketoxime, hydrazine derivatives such as pyrazoles, triazole derivatives, imidazole derivatives, phenol derivatives or the like, amide derivatives such as imides and lactams, hindered amines such as N-isopropyl-N-benzylamine, as well as malonates or keto esters and hydroxamates. These compounds can optionally comprise substituents, especially alkyl chains.

In order to determine the $pK_a$ values defined above, reference may be made to "The determination of ionization constants, a laboratory manual", A. Albert of E. P. Serjeant; Chapman and Hall Ltd, London".

For the list of masking agents, reference may be made to Z. Wicks (frog. Org. Chem., 1975, 3, 73 et Prog. Org. Chem., 1989, 9, 7) and Petersen (Justus Liebigs, Annalen der Chemie 562, 205, (1949).

Preferred temporary masking agents are methyl ethyl ketoxime, also known as MEKO, 3,5-dimethylpyrazole, also known as DMP, 2 or 4 alkylimidazoles, dialkyl malonates, cyclic β-keto esters, amines, hindered amines and caprolactam.

The present invention is not limited only to temporary masking agents but can also employ masking agents said to be permanent. These are characterized by the fact that the isocyanate functional groups are protected by the masking agent and do not react with the hydroxyl functional groups of the compound having a mobile hydrogen, especially with the polyol, under the conditions of storage of the formulated system or during the thermal crosslinking reaction in a furnace.

The isocyanate functional groups are therefore not restored at the time of the crosslinking reaction effected by curing in a furnace and remain masked, said masked functional groups thus being able to react under the crosslinking conditions in a furnace with the methylol (—N—CH$_2$—OH) or alkoxyalkyl (—N—CH$_2$—O-alkyl) functional groups of the aminoplastic resins (melamines, benzoguanamine, etc.) in the presence of an acidic catalyst, preferably a sulfonic acid catalyst, or a latent precursor of that catalyst, which can be a tertiary amine salt of a sulfonic acid.

In some cases, the surfactant present in the coating composition according to the invention can serve as catalyst, especially when the surfactant is of the anionic type and comprises a phosphorus atom.

The masking agents used to permanently protect the isocyanate functional group are generally compounds having hydroxyl or sulfhydryl functional groups, preferably monofunctional functional groups, such as hydroxyl (cyclo)alkanes, for example methanol, butanols, cyclohexanol, 2-ethylhexanol or compounds having carboxylic acid functional groups, such as propionic acid, pivalic acid and benzoic acid. These compounds can optionally carry one or more substituents.

These so-called "permanent" masking agents can also be isocyanate functional groups masked by compounds comprising at least one crosslinkable functional group capable of polymerization by UV radiation. Examples of "permanent" masking agents which may be mentioned are hydroxyalkyl acrylates or hydroxyalkyl methacrylates.

In some cases it is also possible to use, generally in limited amounts, temporary bi- or poly-functional masking agents comprising functional groups capable of yielding temporarily and/or permanently masked isocyanate functional groups. However, this is not preferred since the masked polyisocyanate compounds quickly exhibit high viscosities, and this effect is all the more marked, the higher the functionality of isocyanate functional groups (NCO).

Preferably, in the compositions as defined hereinbefore, the weight ratio between the surfactant system and the (poly)isocyanate is from 3 to 30%, preferably from 5 to 25% and advantageously from 5 to 20%.

These values make it possible to have an emulsion adapted to the various applications envisaged.

Advantageously, the composition according to the present invention can further contain a solvent, the amount of solvent, relative to the amount of mixture formed by the surfactant system and the (poly)isocyanate, being less than 50% by weight, preferably less than 40% by weight, the solvent being selected from the group constituted by esters, ethers, acetals, cyclic or linear carbonates, lactones, glycol or propylene glycol ethers and N-alkyl amides.

The solvent is used in this embodiment in order to lower the viscosity of the starting polyisocyanates.

This content of solvent is necessary especially in order to use compounds such as IPDT, which are solid at ambient temperature and are used in the form of formulations.

The content of solvent is minimized in order to avoid compositions which are too rich in VOCs (volatile organic compounds).

The present invention relates also to a composition, crosslinkable by thermal treatment, as defined hereinbefore, and further comprising at least one compound carrying at least one functional group having a mobile hydrogen selected from the primary or secondary hydroxyl functional groups, phenol functional groups, primary and/or secondary amine functional groups, carboxylic functional groups and an SH functional group, and, where appropriate, at least one organic solvent.

The composition as defined hereinbefore preferably comprises:
from 10% to 60% by weight (poly)isocyanate, based on the total weight of the composition without solvent (% dry weight);
from 0.25% to 12% by weight surfactant, based on the total weight of the composition without solvent (% dry weight);
from 30% to 80% by weight compound carrying at least one functional group having a mobile hydrogen, based on the total weight of the composition without solvent (% dry weight); and
from 0% to 30% by weight organic solvent, based on the total weight of the composition.

The composition as defined hereinbefore can advantageously further comprise at least one aminoplastic resin ("aminoplast" resin) of the type melamine-aldehyde, in particular melamine-formaldehyde, and/or urea-aldehyde, in particular urea-formaldehyde, or benzoguanamine and/or the alkoxyalkyl derivatives thereof.

According to a preferred embodiment, the amount of aminoplastic resin(s) in the composition as defined hereinbefore is from 15% to 25% by weight, based on the total weight of the composition without solvent (% dry weight).

The composition according to the present invention also comprises an aminoplastic or aminoplast-type resin of the melamine-formaldehyde and/or urea-formaldehyde and/or benzoguanamine-formaldehyde type. These polymers are known and details relating to the synthesis thereof are given in the works cited above, especially in the book by Stoye and Freitag on page 102, chapter 6.2.

These aminoplastic resins react especially at a temperature of from 100 to 180° C. with the urethane functional groups of the polyurethane network previously created or formed during the crosslinking reaction in a furnace, due to the reaction of the freed isocyanate functional groups with the hydroxyl functional groups of the polyol or with the true carbamate functional groups (R—O—C(=O)—NH$_2$) optionally carried by the polyols or the polyisocyanates.

The crosslinking reaction of these melamines with the urethane functional groups or true carbamate functional groups (R—O—C(=O)—NH$_2$) is a known reaction which is generally catalyzed by a strong acid, such as para-toluenesulfonic acid or naphthalenesulfonic acid, or even a latent form of said acid catalysts, i.e. the tertiary amine salts of said strong acids. Reference may be made to the books cited above in order to obtain more detailed information regarding these aminoplastic resins and the synthesis thereof.

The presence of one or more aminoplastic resins in the coating composition according to the present invention is particularly advantageous for the formation of the base coat and is not generally necessary for the formation of the top coat, although this is not excluded from the scope of the invention.

The present invention relates also to a composition as defined hereinbefore in which the compound carrying at least one functional group having a mobile hydrogen is a polymer containing at least two hydroxyl (alcohol or phenol) functional groups and/or thiol functional groups and/or primary or secondary amine functional groups and/or containing carboxylic acid functional groups and/or containing precursor functional groups of the epoxy or carbonate type which, by reaction with a suitable nucleophile, free the hydroxyl functional groups.

Preferably, the compounds are selected from the polyols, which can be used alone or in a mixture.

Examples of such compounds which may be mentioned are polyols or polyurethanes in dispersion, polyamines, polythiols, polycaprolactones, polycarbonates and polyacids. These polymers can optionally contain a plurality of functional groups having mobile hydrogens. Mixtures of such polymers can also be used. Generally, polyols selected from polyesters, polyacrylates, polycaprolactones, polycarbonates, polyethers or mixtures thereof are preferred.

Polyesters or acrylic polyols or polyurethane polyols will advantageously be used in coatings exposed to outside conditions.

Polyol compositions classed as latex can also be used. These compounds are generally obtained by radical polymerization of compounds containing alkenyl functional groups, such as acrylates, methacrylates, styrenyls, etc.

Within the scope of the present invention it is also possible to add the acid an amine salt to the compound carrying bonds having a mobile hydrogen function (polyols, polyamines, polycarboxylic acids and polythiols) and then add the polyisocyanate to the mixture previously prepared.

Even more preferably, the composition as defined hereinbefore is characterized in that the compound carrying at least one functional group having a mobile hydrogen is a polyol selected from the acrylic polymers or polyesters or polyurethanes.

In order to enhance the flexibility of the coatings and, in particular, for the "primer" coat, it is preferred to use polyester polyols or urethane polyesters. Generally, a mixture of two polyester or urethane polyester resins is used, one resin being characterized by a "hard" nature and the other by a "soft" or "resilient" nature. The hard or soft nature of the polyesters is conferred by the nature of the monomers during their synthesis.

A "hard" polyester will accordingly be obtained by selecting aromatic and/or cycloaliphatic and/or highly branched acid or alcohol monomers. Examples of monomers of this type which may be mentioned are phthalic anhydride or cyclohexanediol or 2,2,4-trimethylpentanediol.

A "soft" polyester is obtained by selecting slightly branched linear aliphatic monomers, such as adipic acid or 1,4-butanediol or 1,6-hexanediol, or monomers comprising heteroatoms in their structure, such as di- or poly-ethylene glycols. However, the latter are not desirable insofar as these compounds exhibit a weakness with regard to their stability to ultraviolet radiation.

Polyester polyols are industrial products and their synthesis is widely described and known to the person skilled in the art. For more details, reference may be made to the following works: "Matériaux polymères, structure, propriétés et applications" by Gottfried W. Ehrenstein and Fabienne Montagne published in 2000 by Hermès Science; "Handbook of Polyurethanes" by Michael Szycher, published in 1999 by CRC press; "Resins for coatings, Chemistry, Properties and Applications" by D. Stoye and W. Freitag, published by Hanser in 1996, as well as the aforementioned Eurocoat 97 article. The commercial catalogues of companies which supply polyols, in particular the book entitled "Specialty Resins, creating the solution together" of AKZO NOBEL RESINS published in February 2001 may also be consulted.

The polyol as defined hereinbefore advantageously has a functionality of groups having a mobile hydrogen of at least 2, generally from 2 to 100, and preferably from 2 to 30.

According to another advantageous embodiment, the polyol has an OH functionality of from 2 to 30, preferably from 2 to 10.

Generally, for the intended application, an OH functionality which is too high will lead to compounds which are too "hard". It is therefore preferred to use polyester polyols having a relatively low functionality of less than 15, preferably less than 10.

The definition of the average functionality of hydroxyl functional groups per polymer chain is given, for example, in the article by Ben Van Leeuwen entitled "High solids hydroxy acrylics and tightly controlled molecular weight", which appeared in the conference series of Eurocoat 1997 (pp 505-515) on page 507.

This average functionality F(OH) is calculated using the following equation:

$$F(OH) = \frac{OH\ number \times Mn}{56100}$$

in which:
F(OH) represents the average functionality of hydroxyl functional groups;
OH number represents the titre of hydroxyl functional groups expressed in mg of KOH (potassium hydroxide) per gram of polymer; and
Mn represents the number-average molecular weight of the polymer, determined by gel permeation chromatography (GPC), by comparison with polystyrene calibration standards.

The present invention relates also to a composition as defined hereinbefore, characterized in that the number-average molecular weight of the compound carrying at least one functional group having a mobile hydrogen is from 100 to 100,000.

According to a preferred embodiment, the composition as defined hereinbefore comprises a polyol which is a polyester polyol having a number-average molecular weight of from 500 to 10,000, preferably from 600 to 4000.

In some cases it is also possible to use a polyol or a mixture of polyacrylic polyols which can confer greater hardness on the coating. These polyols can be "hard" or "soft" according to whether there are used monomers having an aromatic and/or cycloaliphatic and/or heavily branched nature for the "hard" property and monomers having a primarily aliphatic nature for the "soft" property.

The synthesis of acrylic polyols is also known to the person skilled in the art, and reference may be made to the aforementioned books for more details regarding their synthesis.

The number-average molecular weight for acrylic polyols is generally from 134 to 50,000, preferably from 500 to 25,000, advantageously from 1000 to 15,000.

The titre of hydroxyl functional groups is generally from 10 to 750 mg of KOH per gram of polymer, preferably from 15 to 500 mg of KOH per gram of polymer.

For examples of acrylic polyols, reference may be made to page 515 of the aforementioned Eurocoat 97 article where the characteristics of some acrylic polyols are given, these examples being of a non-limiting nature.

It is also possible to use hyperbranched polyols, which are generally characterized by a greater functionality than linear polyols, but these products are not preferred due to the high viscosity thereof.

Structured or block polyols can also be used if it is desired to subdivide the properties. However, these products, which are generally more expensive, are used only to produce a specific property. These compounds are, for example, a rheological agent or an agent which assists in the dispersion of pigments.

Generally, for the requirements of the present invention, the ratio of isocyanate functional groups/functional groups having a mobile hydrogen is from 3 to 0.5, preferably from 1.5 to 0.8. In particular, when the compound having a mobile hydrogen is a polyol, the isocyanate functional groups/hydroxyl functional groups ratio is from 3 to 0.5, preferably from 1.5 to 0.8.

The present invention relates also to a process for the preparation of a composition as defined hereinbefore, comprising a step of mixing the acid, the amine and the (poly) isocyanate.

When the amine is primary or secondary, it is preferable to avoid it being present alone with the isocyanate since it can react and produce a urea.

When using a secondary or primary amine, it is preferable to proceed to the neutralization step prior to addition with the polyisocyanate in order to avoid undesirable reactions between NCO groups and the amine. If a tertiary amine is used, it is optionally possible to mix the amine with the polyisocyanate and then carry out the neutralization step by adding the acid part.

The present invention relates also to a process for the preparation of a composition as defined hereinbefore, comprising a step of mixing an acid whose $pK_a$ value in water is less than 5, an amine carrying at least one alkylene oxide functional group, and a (poly)isocyanate.

The present invention relates also to a process for the preparation of a composition as defined hereinbefore, in which the amine of the surfactant is a primary or secondary amine, said process being characterized in that it comprises a step of mixing the acid and the amine followed by a step in which the (poly)isocyanate is added.

The present invention relates also to a process for the preparation of a composition as defined hereinbefore, in which the amine of the surfactant is a tertiary amine, said process being characterized in that it comprises a step of mixing the acid and the amine, followed by a step in which the (poly)isocyanate is added, or in that it comprises a step of mixing the amine and the (poly)isocyanate, followed by a step in which the acid is added.

The preparation process of the present invention is carried out at a temperature of preferably from 5 to 100° C., advantageously at a temperature of from 15 to 60° C. and even more preferably from 20 to 50° C., preferably working in an inert atmosphere and avoiding the introduction of water. It is generally preferable to work at ambient temperature but, for specific reasons relating to viscous polyisocyanate formulations, it is possible to work at temperatures greater than ambient temperature.

The present invention relates also to a process for the production of a coated substrate, characterized in that it comprises a step of applying to a substrate a composition crosslinkable by thermal treatment as defined hereinbefore, and a step of crosslinking said composition by thermal treatment.

According to an advantageous embodiment, the process as defined hereinbefore is characterized in that the crosslinking is carried out at a temperature greater than 0° C., preferably close to ambient temperature, and advantageously by thermal treatment at a temperature of from 60° C. to 300° C., preferably greater than 80° C. and lower than 300° C., advantageously from 100° C. to 200° C., for a period of time of from a few seconds to a few hours.

The aforementioned crosslinkable composition can be used as a first coat (preparation of a coating for original equipment) or as a secondary coat, especially as a hardener of the first layer of a coating, or for retouching.

The present invention relates also to a coated substrate obtainable by the process as defined hereinbefore.

The substrate can be of any type and is generally a metal substrate, for example aluminium or steel, in particular stainless steel. The substrate can also be a substrate made of plastics material, i.e. a thermoplastic or thermosetting polymer material, where appropriate comprising fillers, for example reinforcement fillers, such as, for example, glass fibres, carbon fibres and the like.

Due to the properties conferred by the aforementioned coating, the coated substrate can, where appropriate, be folded, moulded or pressed. The substrate so coated has excellent resistance to chipping as well as excellent resistance to pressure washing, even under high pressure, especially in the case of substrates made of plastics materials.

Other additive compounds can be added to the coating formulations, especially to facilitate implementation or to protect or embellish. To that end, mention may be made of antifoams, pigments or colouring agents, and additives conferring resistance to scratches or graffiti. This type of addition is well known to the person skilled in the art or to the formulator of the coating, who will adjust the amounts to the properties required by the application.

The fields of application of the novel compounds are adhesives, paints and varnishes, glues, products for treating textiles or mineral, organic or organic mineral fibres, concrete or walls. The substrates to be coated are wood, metals, textiles, various celluloses, mineral compounds and glasses.

EXAMPLES

TOLONATE® HDT used in the following examples is a hexamethylene diisocyanate (HDI)-based polyisocyanate which is characterized substantially by the presence of isocyanurate rings and, to a lesser degree, of biuret functional groups and dimer rings (diazetidinedione). Its content of isocyanate functional groups is approximately 22%±0.5% by weight and its viscosity is from 2000 to 2800 mPa s at 25° C.

RHODOCOAT® X-EZM 502 is a hexamethylene diisocyanate (HDI)-based hydrodispersible polyisocyanate which is characterized substantially by the presence of isocyanurate rings and, to a lesser degree, of biuret functional groups and dimer rings (diazetidinedione). Its NCO content is approximately 18.4% and its viscosity is of the order of 3600 mPas at 25° C.

Example 1

Synthesis of a Surface-Active Salt 30 g of dodecylbenzenesulfonic acid NANSSA from Huntsmann and 67 g of Jeffamine XTJ 581 from Huntsmann are introduced in succession into a three-necked reactor. An exothermic reaction develops. Stirring is carried out for one hour. The mixture is allowed to return to ambient temperature, and then the product is used to prepare the hydrodispersible polyisocyanate composition.

Examples 2 to 10

Preparation of Other Surface-active Salts

The procedure of Example 1 is followed, a molar ratio acid/base of 1/1 being used.

| Example | Acid | Base |
|---|---|---|
| 2 | Bis(2-ethylhexyl) hydrogen phosphate (Acros) | Jeffamine XTJ 581 Huntsmann |
| 3 | Didodecyl phosphate (Acros) | Jeffamine XTJ 581 Huntsmann |
| 4 | Phosphonopropyl compound* | Jeffamine XTJ 247 Huntsmann |
| 5 | Dibutyl phosphate (Acros) | Jeffamine XTJ 581 Huntsmann |
| 6 | Paratoluenesulfonic acid (Acros) | Jeffamine XTJ 581 Huntsmann |
| 7 | Dibutyl phosphate (Acros) | Jeffamine XTJ 247 Huntsmann |
| 8 | Bis(2-ethylhexyl) hydrogen phosphate (Acros) | Surfonamine L 100 |
| 9 | Didodecyl phosphate (Acros) | Surfonamine L 100 |
| 10 | Dodecylbenzenesulfonic acid (Acros) | Jeffamine XTJ 581 Huntsmann |

*"phosphonopropyl compound" = compound corresponding to the methyl ether of a phosphonopropyltetraoxyethylene, which corresponds to the following structure $CH_3O-(CH_2-CH_2-O)_4-C_3H_7-P(=O)-(OH)_2$

Example 11

Preparation of a Hydrodispersible Polyisocyanate Composition 100 g of TOLONATE HDT from RHODIA and 20 g of surface-active salt from Example 1 are added in succession to a double-jacketed three-necked reactor equipped with a stirring means.

The product is stirred for one hour at ambient temperature and is then placed in a flask.

1H and 13C NMR analysis in CDCL3 medium confirm the structure of the mixture.

The infrared spectrum confirms the presence
- of ether bands (1110-2850 and 949 $cm^{-1}$)
- of the aromatic compound sulfonated in the para-position (1238-1034-1009- and 866 $cm^{-1}$)
- of the primary amine salt 3100 $cm^{-1}$
- of isocyanurate bands (1689 $cm^{-1}$) and dimers (1767 $cm^{-1}$) and of NCO functional groups (2250 $cm^{-1}$).

Examples 12 to 24

Preparation of Hydrodispersible Polyisocyanate Compositions

The procedure of Example 11 is followed, using the salts of Examples 2 to 10.

It is also possible to use in the composition Rhodocoat X-EZM 502 instead of tolonate HDT.

| Example | Starting surfactant (TA) - Example | % by weight Rhodocoat X-EZM 502 | % by weight TA | % by weight Tolonate HDT |
|---|---|---|---|---|
| 12 | 2 | 0 | 20 | 80 |
| 13 | 2 | 0 | 10 | 90 |
| 14 | 2 | 50 | 5 | 45 |
| 15 | 5 | 50 | 5 | 45 |
| 16 | 5 | 0 | 10 | 90 |
| 17 | 5 | 0 | 10 | 90 |
| 18 | 5 | 50 | 5 | 45 |
| 19 | 1 | 50 | 5 | 45 |
| 20 | 1 | 0 | 10 | 90 |
| 21 | 4 | 0 | 10 | 90 |
| 22 | 4 | 0 | 10 | 90 |
| 23 | 4 | 50 | 5 | 45 |
| 24 | 4 | 50 | 5 | 45 |

Evaluation of the Self-emulsification Capacity

The composition and the hydrophilic/hydrophobic nature of the various amines used are important.

The surface-active compositions are evaluated by preparing formulations with an acrylic-type polyol Macrynal 6299 (4.2% OH) from Cytec. The NCO/OH ratio used is 1.4.

The compounds are mixed by hand with the aid of a spatula.

The self-emulsification is rated from 1 to 5, "1" indicating that a homogeneous mixture is obtained in less than a minute, while "5" corresponds to a heterogeneous mixture.

The compositions are then applied to sheets of glass and the visual appearance of the film after 24 hours' drying under controlled conditions (temperature=23° C., relative humidity=50%) is evaluated.

"1" corresponds to a homogeneous and glossy film, "5" corresponds to a film having numerous defects, such as, for example, dewetting.

| Example | Anionic part | Cationic part | % by wt. Rhodocoat X-EZM 502 | % by wt. TA | % by wt. Tolonate HDT | Ease of mixing | Appearance of the film |
|---|---|---|---|---|---|---|---|
| 12 | Bis(2-ethylhexyl) hydrogen phosphate | XTJ 581 | 0 | 20 | 80 | 3 | 3 |
| 13 | Bis(2-ethylhexyl) hydrogen phosphate | XTJ 581 | 0 | 10 | 90 | 1 | 2 |
| 14 | Bis(2-ethylhexyl) hydrogen phosphate | XTJ 581 | 50 | 5 | 45 | 1 | 1 |
| 15 | Dibutyl phosphate | XTJ 581 | 50 | 5 | 45 | 1 | 1 |
| 16 | Dibutyl phosphate | XTJ 581 | 0 | 10 | 90 | 1 | 2 |
| 17 | Dibutyl phosphate | XTJ 581 | 0 | 10 | 90 | 1 | 1 |
| 18 | Dibutyl phosphate | XTJ 581 | 50 | 5 | 45 | 1 | 1 |
| 19 | Dodecylbenzenesulfonic acid | XTJ 581 | 50 | 5 | 45 | 1 | 1 |
| 20 | Dodecylbenzenesulfonic acid | XTJ 581 | 0 | 10 | 90 | 1 | 1 |
| 21 | 3-Phosphonopropyl alcohol ethoxylate cetyl ether-4 EO | XTJ 247 | 0 | 10 | 90 | 1 | 2 |
| 22 | 3-Phosphonopropyl alcohol ethoxylate cetyl ether-4 EO | XTJ 247 | 0 | 10 | 90 | 1 | 2 |
| 23 | 3-Phosphonopropyl alcohol ethoxylate cetyl ether-4 EO | XTJ 247 | 50 | 5 | 45 | 1 | 2 |
| 24 | 3-Phosphonopropyl alcohol ethoxylate cetyl ether-4 EO | XTJ 247 | 50 | 5 | 45 | 1 | 1 |

The following amines are preferably used:
XTJ 247 (Huntsman)

$R=C_{12}-C_{14}$ radical, ethylene oxide/propylene oxide ratio=9/2

XTJ 581 (Huntsman)

$R=CH_3$, ethylene oxide/propylene oxide ratio=12/2

The invention claimed is:

1. A composition comprising:
   at least one isocyanate or polyisocyanate and
   at least one surfactant comprising a reaction product of:
   (i) at least one acid and
   (ii) at least one amine or polyamine carrying at least one alkylene oxide functional group;
   wherein the at least one acid is selected from the group constituted of:
   sulfonic acids;
   monoesters and diesters of alkyl phosphates;
   mono- and di-ester phosphates of polyethylene glycol monoalkyl ether;
   and mixture thereof,
   wherein the composition does not include a polyol.

2. The composition of claim 1, wherein (ii) comprises at least one acid whose $pK_a$ in water is less than 5.

3. The composition of claim 1, wherein the at least one amine has the following formula (A):

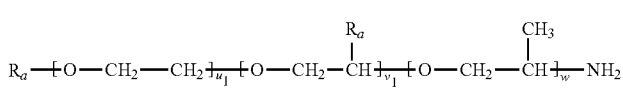

(A)

in which: * $u_1$ represents an integer greater than or equal to 2,
* $v_1$ represents an integer from 0 to 30,
* w represents an integer from 1 to 30,
* $R_a$ represents an alkyl group containing from 1 to 20 carbon atoms, it being possible for all the groups $R_a$ to be identical or different.

4. The composition of claim 1, wherein the at least one polyisocyanate or isocyanate is a polyisocyanate selected from the products of homo- or hetero-condensation of alkylene diisocyanate, comprising urea, urethane, allophanate, ester, amide, acylurea, isocyanurate, oxadiazinetrione, imino-dimer, imino-trimer, imino oxadiazinedione and diazetidinedione functional groups, and mixtures thereof.

5. The composition of claim 1, wherein the at least one polyisocyanate or isocyanate is a polyisocyanate having an average functionality of isocyanate functional groups of at least 2.

6. The composition of claim 1, wherein the at least one polyisocyanate or isocyanate is a polyisocyanate and the weight ratio between the surfactant system and the polyisocyanate is from 3 to 30%.

7. The composition of claim 1, characterized in that the at least one polyisocyanate or isocyanate is a polyisocyanate and the composition further comprises a solvent, the amount of solvent, relative to the amount of the mixture formed by the surfactant system and the polyisocyanate, being less than 50% by weight, the solvent being selected from the group consisting of esters, ethers, acetals, cyclic or linear carbonates, lactones, and N-alkyl amides.

8. The composition of claim 3, wherein the at least one amine is selected from the group consisting of an amine of formula (A) in which v1 is other than 0, $R_a$ represents a C12-C14-alkyl radical and the ethylene oxide/propylene oxide ratio (u1/w) is 9/2, having a molecular weight of approximately 700;
an amine of formula (A) in which v1 is other than 0, Ra represents a methyl group and the ethylene oxide/propylene oxide ratio (u1/w) is 12/2, having a molecular weight of approximately 730; and mixtures thereof.

9. The composition of claim 3, wherein the at least one sufactant is selected from the group consisting of:
bis(2-ethyl-hexyl) phosphate salts of an amine of formula (A) in which v1 is other than 0, Ra represents a methyl group and the ethylene oxide/propylene oxide ratio (u1/w) is 12/2, having a molecular weight of approximately 730;
dibutyl phosphate salts of an amine of formula (A) in which v1 is other than 0, Ra represents a methyl group and the ethylene oxide/propylene oxide ratio (u1/w) is 12/2, having a molecular weight of approximately 730;
para-toluenesulfonate salts of an amine of formula (A) in which v1 is other than 0, Ra represents a methyl group and the ethylene oxide/propylene oxide ratio (u1/w) is 12/2, having a molecular weight of approximately 730;
dodecylbenzenesulfonate salts of an amine of formula (A) in which v1 is other than 0, Ra represents a methyl group and the ethylene oxide/propylene oxide ratio (u1/w) is 12/2, having a molecular weight of approximately 730;
3-phosphonopropyltetraoxyethylene cetyl ether salts of an amine of formula (A) in which v1 is other than 0, Ra represents a C12-C14-alkyl radical and the ethylene oxide/propylene oxide ratio (u1/w) is 9/2, having a molecular weight of approximately 700; and
mixtures thereof.

* * * * *